Patented Dec. 30, 1924.

1,521,206

UNITED STATES PATENT OFFICE.

FRITZ STRAUB, OF BASEL, AND HERMANN SCHNEIDER, OF RIEHEN, NEAR BASEL, SWITZERLAND, ASSIGNORS TO SOCIETY OF CHEMICAL INDUSTRY IN BASLE, OF BASEL, SWITZERLAND.

MONAZO DYES CONTAINING TWO HYDROXYNAPHTHALENE NUCLEI.

No Drawing. Application filed March 31, 1924. Serial No. 703,250.

*To all whom it may concern:*

Be it known that we, FRITZ STRAUB, residing at Basel, Switzerland, and HERMANN SCHNEIDER, residing at Riehen, near Basel, Switzerland, both citizens of the Confederation of Switzerland, have invented new and useful Improvements in Monazo Dyes Containing Two Hydroxynaphthalene Nuclei, of which the following is a full, clear, and exact specification.

The present invention relates to new dyestuffs which constitute valuable dyestuffs capable of being after-chromed. The invention comprises the new dyestuffs, the method of their manufacture, as well as the fibres which have been dyed with the new dyestuffs.

It has been found that the dyestuffs produced by coupling the nitrated diazo-compound of 1-amino-2-hydroxynaphthalene-4-sulphonic acid with a naphthol can be converted by treatment with reducing agents into new black mordant dyeing dyestuffs presumably having the general formula:

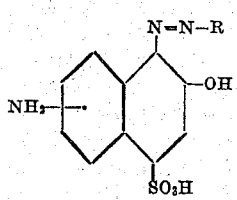

(in which R indicates an hydroxynaphthalene nucleus to which the azo-bridge is attached in an ortho-position to the hydroxyl-group).

They form blackish-brown powders which dissolve in a sodium carbonate solution with a blue colour and in dilute caustic soda solution with a blue-red to blue-violet colour. They dye wool in an acid bath dark brown to black-blue shades which become black by after-chroming. They differ from the parent dyestuffs by their superior solubility, even in calcareous water, and their superior levelling. By chroming they yield very full blooming black shades completely fast to fulling and potting and very fast to light. As reducing agents, sulphides, sulfhydrates and polysulphides of alkali and alkaline earth metals come chiefly into consideration, while other similarly acting agents, such as for instance ferrous hydroxide or carbonate may be mentioned. As a technical process there is best used for the reduction such agents and methods as can be used after the coupling operation without any further procedure, such as the separation of the dyestuff or the separation of metals as a sequence to the reduction.

The following examples illustrate the invention, the parts being by weight:—

*Example 1.*

A suspension as concentrated as possible of the dyestuff obtained by coupling 46.5 parts of α-naphthol with 95 parts of the sodium salt of the nitrated diazo-compound of 1-amino-2-hydroxynaphthalene-4-sulphonic acid, is added, while stirring, to a molten mixture of 20 parts of water and 120 parts of crystallized sodium sulphide and the stirring of the mixture is continued for some time at the ordinary temperature until the sodium sulphide has been used up. It is then diluted with water. The excess of alkali is neutralized with mineral acid and the reduced dyestuff is salted out and filtered.

When dry the new dyestuff which has the probable formula:

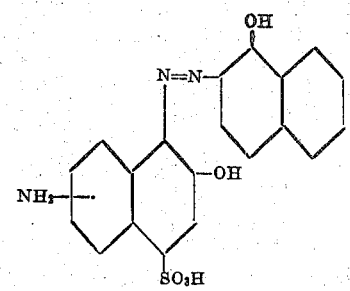

is a black-brown powder which is soluble in water to a violet-brown solution becoming brown-red on addition of acid, blue on addition of sodium carbonate solution and bluish-red on addition of caustic alkali. It dies wool in an acid bath violet or brownish-black shades which become grey or black when after-chromed and are very fast.

By use of another reducing agent the same result is obtained but the conditions may be somewhat altered with advantage: for example if the reducing agent used is a polysulphide solution made from 72 parts of crystallized sodium sulphide, 9.6 parts of sulphur and 20 parts of water, the temperature of reduction is kept at about 50° C. When the reduction occurs in the presence of caustic potash the temperature may be kept at an essentially lower degree.

Example 2.

A freshly made paste of as high a concentration as possible containing 44 parts of the free dyestuff acid of the dyestuff made by coupling the nitrated diazo-compound of 1-amino-2-hydroxynaphthalene-4-sulphonic acid with α-naphthol is introduced into a solution of 18.4 parts of sodium sulfhydrate and 30 parts of water, whereupon a slight evolution of sulphuretted hydrogen occurs. The mixture is warmed for some time at 50° C. whereby the dyestuff is converted into its amino-derivative.

The dyestuff is identical with that obtained as described in Example 1 and is separated as therein stated.

Example 3.

A suspension as concentrated as possible of the dyestuff made by coupling 46.5 parts of β-naphthol with 95 parts of the sodium salt of the nitrated diazo-compound of 1-amino-2-hydroxynaphthalene-4-sulphonic acid, containing about 5 parts of sodium carbonate, is mixed, while stirring, with a lukewarm solution of 72 parts of crystallized sodium sulphide, 9.6 parts of sulphur, 12 parts of caustic soda and 58 parts of water; the whole is heated for some time at 80-90° C. with continued stirring, whereby the mass, which is at first a thick magma, becomes a thin fluid.

The product of reaction is then poured into water, the excess of alkali is neutralized in greater part with mineral acid and the dyestuff is salted out. It is a black-brown powder, soluble in water to a violet-brown solution which, on addition of sodium carbonate solution becomes greenish-blue; blue-violet on addition of caustic alkali and red-brown on addition of acid.

The new dyestuff dyes wool in an acid bath red-violet or brownish-black shades, which become grey or black and very fast when after-chromed.

Example 4.

A suspension as concentrated as possible of the dyestuff made by coupling 150 parts of β-naphthol with 285 parts of the sodium salt of the nitrated diazo-compound of 1-amino-2-hydroxynaphthalene-4-sulphonic acid, is mixed, while stirring, with a molten mixture of 50 parts of water and 360 parts of crystallized sodium sulphide. The mass is then heated to 75-80° C. with continued stirring, whereby reaction occurs in the course of which the mixture becomes a thin fluid. Stirring is continued for some time at 80° C., then the mixture is diluted with a common salt solution, and the excess of alkali carefully neutralized with mineral acid. The dyestuff which has separated is filtered and dried.

Example 5.

A freshly made suspension as concentrated as possible of the dyestuff made by coupling 271 parts of 1-hydroxynaphthalene-4-sulphonic acid with 295 parts of the nitrated diazo-compound of 1-amino-2-hydroxynaphahtlene-4-sulphonic acid in the presence of 145 parts of caustic soda solution of 80 per cent. strength and 10 parts of sodium carbonate, is mixed with 360 parts of crystallized sodium sulphide and the mixture is stirred for a sufficiently long time. It is then diluted with water and the dyestuff is separated as a brown-black precipitate by salting out and slightly acidifying the liquid obtained.

When dry the new dyestuff is a black-brown powder which dissolves in water to a violet-brown solution becoming Bordeaux-red on addition of acid, blue on addition of sodium carbonate solution and brown-red on addition of caustic alkali. It dyes wool in an acid bath black-blue shades which become black by after-chroming.

What we claim is:

1. As a new process the herein described manufacture of new dyestuffs, consisting in treating with a water-soluble sulfide the dyestuffs obtained by coupling the nitrated diazo-compound of 1-amino-2-hydroxynaphathalene-4-sulphonic acid with a naphthol.

2. As a new process the herein described manufacture of new dyestuffs, consisting in treating with a water-soluble sulfide the dyestuffs obtained by coupling the nitrated diazo-compound of 1-amino-2-hydroxynaphthalene-4-sulphonic acid with an unsubstituted naphthol.

3. As a new process the herein described manufacture of new dyestuffs, consisting in treating with an alkali metal sulphide the dyestuffs obtained by coupling the nitrated diazo-compound of 1-amino-2-hydroxynaphathalene-4-sulphonic acid with an unsubstituted naphthol.

4. As a new process the herein described manufacture of new dyestuffs, consisting in treating with an alkali metal sulphide the dyestuffs obtained by coupling the nitrated diazo-compound of 1-amino-2-hydroxynaphahalene-4-sulphonic acid with an α-naphthol.

5. As new products the new dyestuffs of the probable general formula:

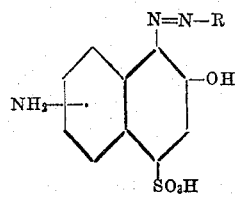

(in which R indicates an hydroxynaphthalene nucleus which the azo-bridge is attached in an ortho-position to the hydroxyl-group), which dyestuffs are obtained by reduction of the dyestuffs obtained by coupling the nitrated diazo-compound of 1-amino-2-hydroxynaphthalene-4-suphonic acid with a naphthol, and which dyestuffs form blackish-brown powders which dissolve in a sodium carbonate solution with a blue colour and in dilute caustic soda solution with a blue-red to blue-violet colour, dyeing wool in an acid bath dark brown to black-blue shades which become black by after-chroming and are very fast.

6. As new products the new dyestuffs of the probable general formula:

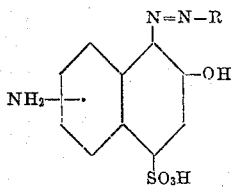

(in which R indicates an hydroxynaphthalene nucleus which carries no further substituents and to which the azo-bridge is attached in an ortho-position to the hydroxyl-group), which dyestuffs are obtained by reduction of the dyestuffs obtained by coupling the nitrated diazo-compound of 1-amino-2-hydroxynaphthalene-4-sulphonic acid with an unsubstituted naphthol, and which differ from the parent dystuffs by their superior solubility, even in calcareous water, their superior levelling, and their fastness to potting, and which dyestuffs form blackish-brown powders which dissolve in a sodium carbonate solution with a blue colour and in dilute caustic soda solution with a blue-red to blue-violet colour, dyeing wool in an acid bath dark brown to black-blue shades which become black by after-chroming and are very fast.

7. As a new product the new dyestuff of the probable formula:

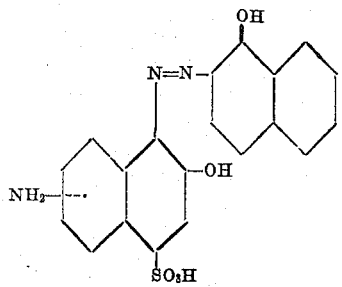

which dyestuff is obtained by reduction of the dyestuff obtained by coupling the nitrated diazo-compound of 1-amino-2-hydroxynaphthalene-4-sulphonic acid with α-naphthol, and which differs from the parent dyestuffs by its superior solubility, even in calcareous water, its superior levelling, and its fastness to potting, and which dyestuff forms a black-brown powder which is soluble in water to a violet-brown solution becoming brown-red on addition of acid, blue on addition of sodium carbonate solution and bluish-red on addition of caustic alkali, dyeing wool in an acid bath violet or brownish-black shades which become grey or black by after-chroming and are very fast.

8. Material dyed with the dyestuffs according to claim 5.

9. Material dyed with the dyestuffs according to claim 6.

10. Material dyed with the dyestuff according to claim 7.

In witness whereof we have hereunto signed our names this 19th day of March 1924, in the presence of two subscribing witnesses.

FRITZ STRAUB.
HERMANN SCHNEIDER.

Witnesses:
AMAND BAUER,
MADELEINE SPENGLER.